(12) United States Patent
Kim

(10) Patent No.: US 11,256,254 B2
(45) Date of Patent: Feb. 22, 2022

(54) APPARATUS, SYSTEM AND METHOD FOR CONTROLLING A VEHICLE TO PASS A HIGH-PASS LANE OF A TOLL BOOTH

(71) Applicants: HYUNDAI MOTOR COMPANY, Seoul (KR); KIA MOTORS CORPORATION, Seoul (KR)

(72) Inventor: Jun Soo Kim, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 293 days.

(21) Appl. No.: 16/193,132

(22) Filed: Nov. 16, 2018

(65) Prior Publication Data

US 2020/0089224 A1 Mar. 19, 2020

(30) Foreign Application Priority Data

Sep. 17, 2018 (KR) .................. 10-2018-0110923

(51) Int. Cl.
| | |
|---|---|
| *G05D 1/00* | (2006.01) |
| *G08G 1/16* | (2006.01) |
| *G07B 15/06* | (2011.01) |
| *B60W 30/18* | (2012.01) |

(52) U.S. Cl.
CPC ..... *G05D 1/0061* (2013.01); *B60W 30/18009* (2013.01); *G05D 1/0088* (2013.01); *G07B 15/06* (2013.01); *G08G 1/167* (2013.01); *B60W 2555/60* (2020.02); *G05D 2201/0213* (2013.01)

(58) Field of Classification Search
None
See application file for complete search history.

(56) References Cited

U.S. PATENT DOCUMENTS

| | | | |
|---|---|---|---|
| 2013/0124084 A1* | 5/2013 | Seo | G01C 21/3638 701/436 |
| 2014/0156133 A1* | 6/2014 | Cullinane | B60R 16/023 701/23 |
| 2017/0001650 A1* | 1/2017 | Park | B60W 30/06 |
| 2018/0037223 A1* | 2/2018 | Goto | G05D 1/0231 |
| 2018/0203455 A1* | 7/2018 | Cronin | G01C 21/3492 |
| 2018/0364709 A1* | 12/2018 | Choi | G05D 1/0061 |
| 2019/0004179 A1* | 1/2019 | Hwang | H04W 64/00 |
| 2019/0248382 A1* | 8/2019 | Hashimoto | B60W 30/16 |
| 2020/0148221 A1* | 5/2020 | Degawa | B60W 10/04 |

FOREIGN PATENT DOCUMENTS

KR 103714584 B * 4/2014

* cited by examiner

*Primary Examiner* — Abdhesh K Jha
(74) *Attorney, Agent, or Firm* — Lempia Summerfield Katz LLC

(57) ABSTRACT

An apparatus for controlling a vehicle includes a processor and a storage storing information determined by the processor. The processor determines whether a vehicle enters a tollgate, in advance based on driving situation information, and determine whether a current driving lane of the vehicle is a high-pass lane or a general lane, when the vehicle is scheduled to enter the tollgate. In particular, to the processor may automatically switch a driving mode depending on whether the current driving lane of the vehicle is the high-pass lane or the general lane to control the vehicle.

15 Claims, 12 Drawing Sheets

APPARATUS, SYSTEM AND METHOD FOR CONTROLLING A VEHICLE TO PASS A HIGH-PASS LANE OF A TOLL BOOTH

CROSS-REFERENCE TO RELATED APPLICATION

This application claims the priority to and the benefit of Korean Patent Application No. 10-2018-0110923, filed on Sep. 17, 2018, the entire contents of which are incorporated herein by reference.

FIELD

The present disclosure relates to an apparatus for controlling a vehicle, a system having the same, and a method thereof.

BACKGROUND

The statements in this section merely provide background information related to the present disclosure and may not constitute prior art.

Nowadays, the rapid development of the IT technology increases the interest in the intelligent automobile converged with a vision system. In particular, the advanced safety automobile technology reduces the risk of traffic accidents and assists safety driving. For example, a lane departure warning system, a lane keeping assist system, a collision warning system, a lane change control system, an advanced driver assistance system (ADAS), and an autonomous driving system are based on the intelligent automobile technology, and a great deal of manpower and resources are invested in those technologies.

Such the autonomous driving system or driving assist system may release the autonomous driving function or driving assist function of a vehicle for safe driving in a tollgate entry section on a highway or a motorway, and a user (the driver) may control an operation of the vehicle such that the user drives directly and safely to pass through the tollgate.

We have discovered that the autonomous driving function or the driving assist function may not be provided continuously in the tollgate entry section, thereby reducing the user's convenience and the usability of the vehicle system.

SUMMARY

The present disclosure has been made to solve the above-mentioned problems occurring in the prior art while advantages achieved by the prior art are maintained intact.

An aspect of the present disclosure provides an apparatus for controlling a vehicle, a system having the same, and a method thereof that determines a lane on which a vehicle is currently driving and automatically switches a driving mode depending on the determination result to control the vehicle.

The technical problems to be solved by the present disclosure are not limited to the aforementioned problems, and any other technical problems not mentioned herein will be clearly understood from the following description by those skilled in the art to which the present disclosure pertains.

In one form of the present disclosure, an apparatus for controlling a vehicle may include: a processor that determines whether the vehicle enters a tollgate, in advance, based on driving situation information, determines, when the vehicle is scheduled to enter the tollgate, whether a current driving lane of the vehicle is a high-pass lane or a general lane, and automatically switches a driving mode based on the current driving lane of the vehicle to control the vehicle; and a storage storing information determined by the processor.

According to another form, the driving situation information may include at least one of image information in front of the vehicle, sensing information, map information, location information, and information received from an outside of the vehicle.

According to an exemplary form, the processor may be configured to determine whether the current driving lane of the vehicle is the high-pass lane or the general lane, based on at least one of a high-pass gate sign in front, a high-pass guidance line, a high-pass guidance sign, a high-pass road marking, and whether a current driving lane is split.

According to another exemplary form, the processor may be configured to determine whether the current driving lane is split, based on at least one of an increase in the number of lanes in front, whether a lane width of the current driving lane of the vehicle increases, and whether a split center line in the current driving lane of the vehicle is generated.

In one form, the processor may be configured to determine that the current driving lane of the vehicle is the high-pass lane, when a high-pass guidance lane is present in the current driving lane of the vehicle or when a high-pass gate is present in front.

In another form, when the high-pass guidance lane is not present in the current driving lane of the vehicle and the high-pass gate is not present in front, the processor may be configured to determine whether a high-pass sign is present in front or whether a high-pass road marking is present in a lane to determine that the current driving lane is a high-pass lane candidate, when the high-pass sign is present in front or the high-pass road marking is present in the current driving lane.

According to an exemplary form, when the high-pass sign is not present in front and the high-pass road marking is not present in the current driving lane, the processor may be configured to determine whether the current driving lane of the vehicle is split.

According to another form, the processor may be configured to determine that the current driving lane is split, when at least one of an increase in the number of lanes in front of the vehicle, an increase in a lane width of the current driving lane of the vehicle, and generation of a split center line in the current driving lane of the vehicle occur.

In other form, the processor may be configured to determine and control a driving mode as a driver mode, when the current driving lane of the vehicle is the general lane.

According to another form, the processor may be configured to determine whether the tollgate is opened or closed, when the current driving lane of the vehicle is the high-pass lane.

According to other form, the processor may be configured to determine whether the tollgate is opened or closed, based on at least one of information about whether the tollgate is opened or closed, a state of an indicator light indicating that it is possible to enter a high-pass gate, whether a stop obstacle is present at an entrance of the high-pass gate, and whether a preceding vehicle passes through the high-pass gate, which are received from an outside of the vehicle.

According to another form, the processor may be configured to determine that the tollgate is opened, when information of a status of the tollgate indicates that the tollgate is open, when the state of the indicator light indicates that it is possible to enter the high-pass gate, when the stop obstacle is not present at the entrance of the high-pass gate, or when the preceding vehicle passes through the high-pass gate.

According to an exemplary form, the processor may be configured to determine and control the driving mode as an assist mode, when it is determined that the tollgate is closed.

According to an exemplary form, the processor may be configured to determine whether it is possible to pass through the tollgate, when it is determined that the tollgate is opened.

According to an exemplary form, the processor may be configured to determine that it is possible to pass through the tollgate, when at least two following information indicate that the toll gate is open: the information about whether the tollgate is opened or closed, the state of the indicator light indicating that it is possible to enter the high-pass gate, whether the stop obstacle is present at the entrance of the high-pass gate, and whether the preceding vehicle passes through the high-pass gate, which are received from the outside of the vehicle.

According to an exemplary form, the processor may be configured to determine and control the driving mode as a pilot mode, when it is possible to pass through the tollgate.

According to an aspect of the present disclosure, a vehicle system may include: a sensing module obtaining driving situation information in front of a vehicle and in a lane; and a vehicle controlling apparatus that determines whether the vehicle enters a tollgate, in advance, based on the driving situation information. The vehicle controlling apparatus also determines, when the vehicle is scheduled to enter the tollgate, whether a current driving lane of the vehicle is a high-pass lane or a general lane and automatically switches a driving mode based on whether the current driving lane of the vehicle is the high-pass lane or the general lane to control the vehicle.

According to an aspect of the present disclosure, a method for controlling a vehicle may include: determining, by a processor, whether the vehicle enters a tollgate; determining, by the processor, when the vehicle is scheduled to enter the tollgate, whether a current driving lane of the vehicle is a high-pass lane or a general lane, based on driving situation information; and automatically switching, by the processor, a driving mode based on whether the current driving lane of the vehicle is the high-pass lane or the general lane to control the vehicle.

According to another form, the method may further include: determining that the driving mode is a driver mode, when the current driving lane of the vehicle is the general lane; and determining, when the current driving lane of the vehicle is the high-pass lane, that the driving mode is an assist mode or a pilot mode, based on a state where it is possible to pass through the tollgate.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
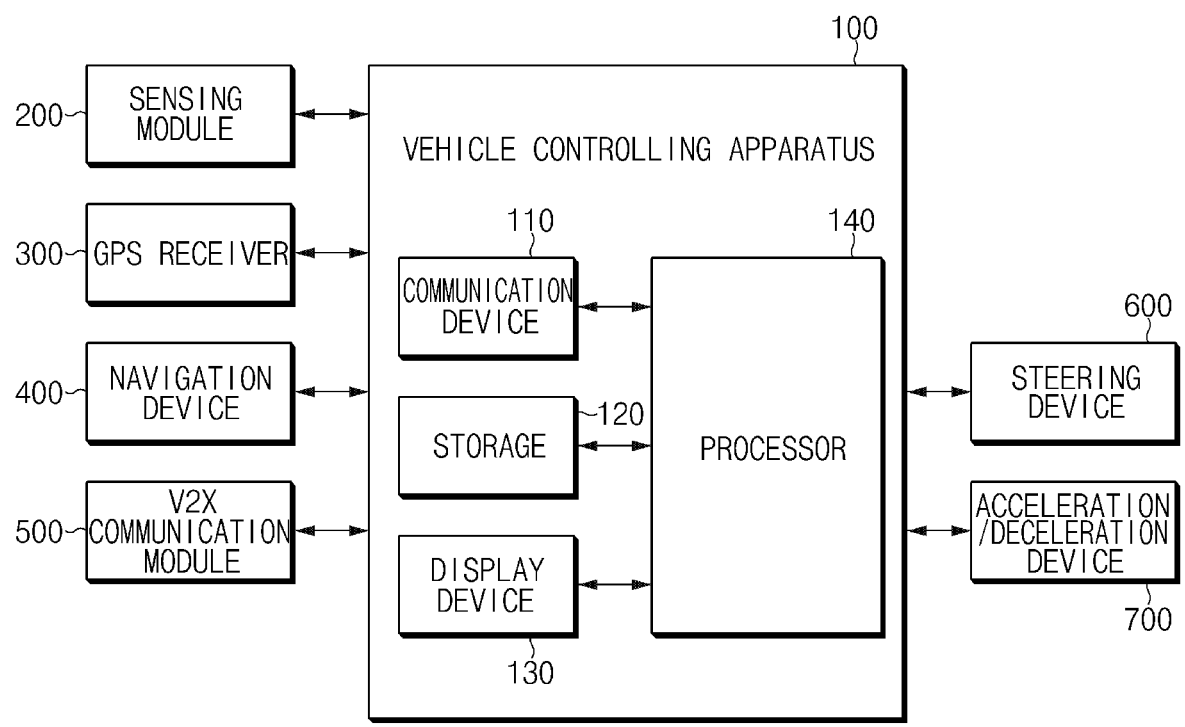
FIG. 1 is a block diagram illustrating a configuration of a vehicle system including an apparatus to control a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, a detailed description of well-known features or functions will be ruled out in order not to unnecessarily obscure the gist of the present disclosure.

In describing elements of exemplary forms of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Below, various forms of the present disclosure will be described in detail with reference to FIGS. 1 to 8.

FIG. 1 is a block diagram of a vehicle system including a vehicle controlling apparatus, according to one form of the present disclosure.

The vehicle system may include a vehicle controlling apparatus 100, a sensing module 200, a Global Positioning System (GPS) receiver 300, a navigation device 400, a V2X communication module 500, a steering device 600, and an acceleration/deceleration device 700. The vehicle system of FIG. 1 may be mounted in a vehicle.

The vehicle controlling apparatus 100 may determine a driving lane based on GPS information received from the GPS receiver 300, map information received from the navigation device 400, information obtained by the sensing module 200, and the like and may determine a driving mode depending on the determined driving lane. At this time, the determination of the driving lane is to determine whether a lane on which a vehicle is currently driving is a high-pass lane or a general lane; the high-pass lane is a lane that needs to pay the highway fare at the tollgate through a high-pass terminal; the general lane is a lane that needs to pay a highway fare with a card or cash through the highway's employee, not a high-pass terminal. In addition, the driving mode may include a driver mode, an assist mode, and a pilot mode. The driver mode is a mode in which a user (driver) drives directly; the assist mode is a mode in which the vehicle system assists the driving support but the subject of the determination responsibility is the user (autonomous driving Lv. 1 & 2); the pilot mode is a mode in which the vehicle system is responsible for all driving support and determination (autonomous driving Lv. 3 & 4). The high-pass is an electronic toll collection system that enables to pay for highway tolls by wireless communication in a car in motion.

The vehicle controlling apparatus 100 may be electrically connected to the sensing module 200, the GPS receiver 300, the navigation device 400, the steering device 600, the acceleration/deceleration device 700, and the like, may control the sensing module 200, the GPS receiver 300, the navigation device 400, the steering device 600, and the acceleration/deceleration device 700, and may perform various data processing and calculation.

The vehicle controlling apparatus 100 may include a communication device 110, storage 120, a display device 130, and a processor 140.

The communication device 110 may be a hardware device implemented with various electronic circuits for transmitting and receiving signals via a wireless or wired connection; in the present disclosure, the communication device 110 may communicate with devices in a vehicle over CAN communication, LIN communication, or the like and may communicate with devices outside the vehicle over wireless communication.

The storage 120 may store driving situation information received from the sensing module 200, the GPS receiver 300, the navigation device 400, the V2X communication module 500, and the like, driving lane determination information and driving mode information, and the like, which are determined by the processor 140. The driving situation information may include at least one or more pieces of information among image information of the front of a vehicle, sensing information, map information, location information, and information received from the outside of the vehicle.

The storage 120 may include at least one type of a storage medium among a flash memory type of a memory, a hard disk type of a memory, a micro type of a memory, and a card type (e.g., a Secure Digital (SD) card or an eXtream Digital (XD) Card) of a memory, a Random Access Memory (RAM) type of a memory, a Static RAM (SRAM) type of a memory, a Read-Only Memory (ROM) type of a memory, a Programmable ROM (PROM) type of a memory, an Electrically Erasable PROM (EEPROM) type of a memory, an Magnetic RAM (MRAM) type of a memory, a magnetic disk type of a memory, and an optical disc type of a memory.

The display device 130 may display driving information for driving the vehicle such as a vehicle driving mode or the like. The example of vehicle driving mode guidance is illustrated in Table 1 below.

TABLE 1

Ex. 1) Support the pass of a tollgate in the pilot mode.
Ex. 2) Would you like to accept the change to the high-pass lane to maintain the pilot mode?
    Yes   Perform lane change control.
    No    Switch to the driver mode for passing through a general lane.

The display device 130 may be implemented with a Head Up Display (HUD), a cluster, an Audio Video Navigation (AVN), or the like. In addition, the display device 130 may directly receive a color input from a user through a User Setting Menu (USM) menu of a cluster. Furthermore, the display device 130 may include at least one of a Liquid Crystal Display (LCD), a Thin Film Transistor-LCD (TFT LCD), a Light Emitting Diode (LED) display, an Organic LED (OLED) display, an Active Matrix OLED (AMOLED) display, a flexible display, a bended display, and a 3D display. Some of the displays may be implemented with a transparent display that is transparent or optically transparent to view the outside. Moreover, the display device 130 may be provided as a touchscreen including a touch panel and may be used as an input device in addition to an output device.

The processor 140 may be electrically connected to the communication device 110, the storage 120, and the display device 130, may electrically control each of the components, may be an electrical circuit that executes the instructions of the software, and may perform various data processing and calculation described below. For example, the processor 140 may be an electronic control unit (ECU) or a sub-controller mounted in a vehicle.

The processor 140 may determine, in advance, whether a vehicle is scheduled to pass through a tollgate, using the driving route received from the navigation device 400 and the GPS information of the GPS receiver 300. Furthermore, the processor 140 may identify the sign of a tollgate or the like based on the forward view image data and the sensing information (LiDAR or radar) on driving to determine whether the vehicle has passed through the tollgate.

The processor 140 may determine whether a lane on which the vehicle is currently driving is a high pass lane or a general lane, based on the surrounding information. The surrounding information may include at least one or more of GPS information received from the GPS receiver 300, detailed map information received from the navigation device 400, periphery sensing information by the sensing module 200, and information received from the outside of a vehicle through the V2X communication module 500.

The processor 140 may determine whether the vehicle enters a tollgate, in advance based on the driving situation information; and the processor 140 may determine whether the current driving lane of the vehicle is a high-pass lane or a general lane and may automatically switch the driving mode depending on the current driving lane of the vehicle to control the vehicle, when the vehicle is scheduled to enter the tollgate.

The processor 140 may determine whether the current driving lane of the vehicle is a high-pass lane or a general lane, by using at least one or more of a high-pass gate sign in front of a vehicle, a high-pass guidance line, a high-pass guidance sign, high-pass road marking, and whether the current driving lane is split.

The processor 140 may determine whether the current driving lane is split, based on at least one or more of an increase in the number of lanes in front of a vehicle, whether a lane width of the driving lane of the vehicle increases, and whether a split center line in the driving lane of the vehicle is generated.

Figure 2A:
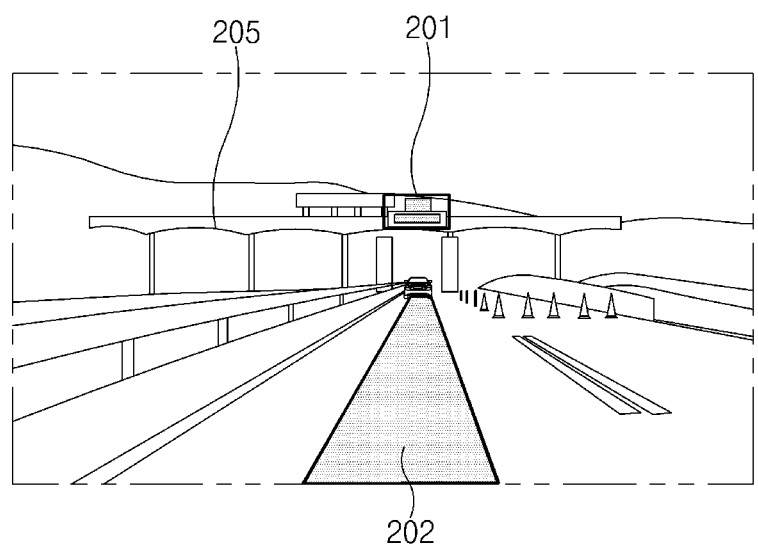
FIG. 2A is a view for describing an operation of determining a driving lane by using a high-pass gate or a high-pass guidance lane.

The processor 140 may determine that the current driving lane of the vehicle is a high-pass lane, when the high-pass guidance lane is present in the current driving lane of the vehicle or when the high-pass gate is present in front of a vehicle. FIG. 2A is a view for describing an operation of determining a driving lane by using a high-pass gate or a high-pass guidance lane, according to one form of the present disclosure. Referring to FIG. 2A, the vehicle controlling apparatus 100 may recognize a high-pass gate 201 of a tollgate 205 and a high-pass guidance lane 202 at the center of a current driving lane based on information obtained from the sensing module 200 such as a camera, a LiDAR, a laser sensor, or the like to determine that the driving lane is a high-pass lane.

Figure 2B:
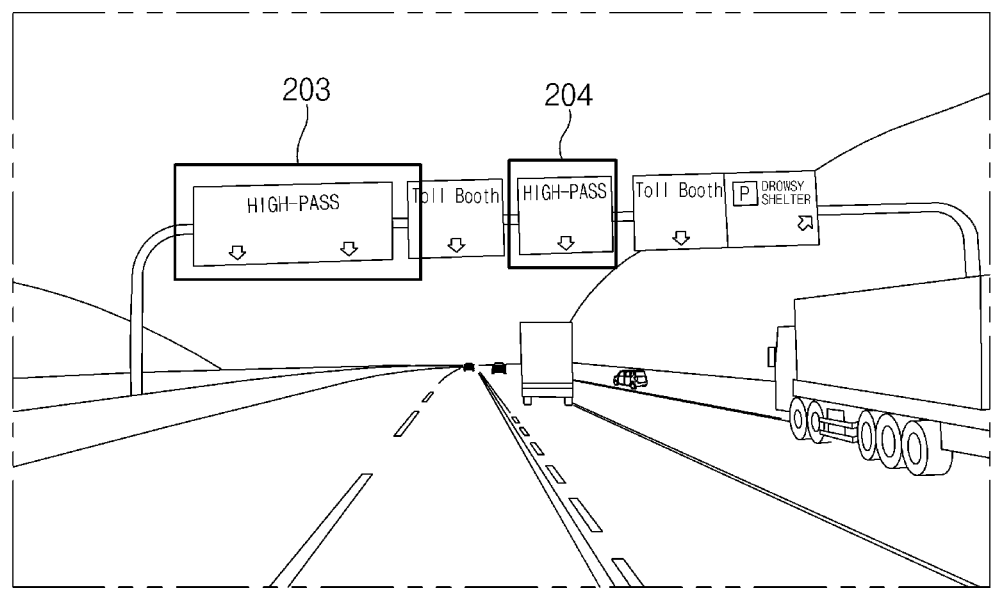
FIG. 2B is a view for describing an operation of determining a driving lane by using a high-pass sign.
Figure 2C:
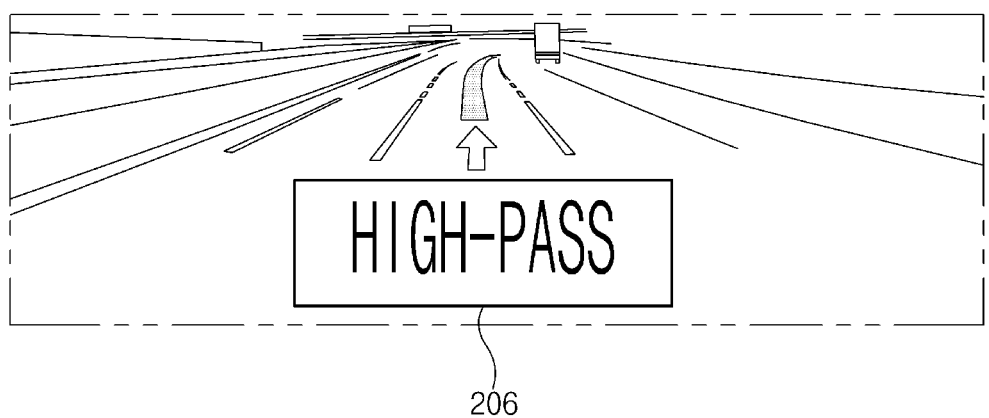
FIG. 2C is a view for describing an operation of determining a driving lane by using high-pass road marking.

The processor 140 may determine whether a high-pass sign is present in front of a vehicle or whether the high-pass road marking is present in the lane, when a high-pass guidance lane is not present in the current driving lane of the vehicle and a high-pass gate is not present in front of the vehicle; the processor 140 may determine that the driving lane is a high-pass lane candidate, when the high-pass sign is present in front of the vehicle or the high-pass road marking is present in the lane. FIG. 2B is a view for describing an operation of determining a driving lane by using a high-pass sign, according to another form of the present disclosure. FIG. 2C is a view for describing an operation of determining a driving lane by using high-pass road marking, according to other form of the present disclosure. The vehicle controlling apparatus 100 may determine that a current driving road is a high-pass lane, by using guidance signs 203 and 204 on a road or based on high-pass road marking 206 of the current driving road illustrated in FIG. 2C, when the vehicle controlling apparatus 100 is located at a distance from the toll gate as shown in FIG. 2B.

The processor 140 may determine whether a lane on which a vehicle is currently driving is split, when the high-pass sign is not present in front of the vehicle and the high-pass road marking is not present in the lane.

Figure 3A:
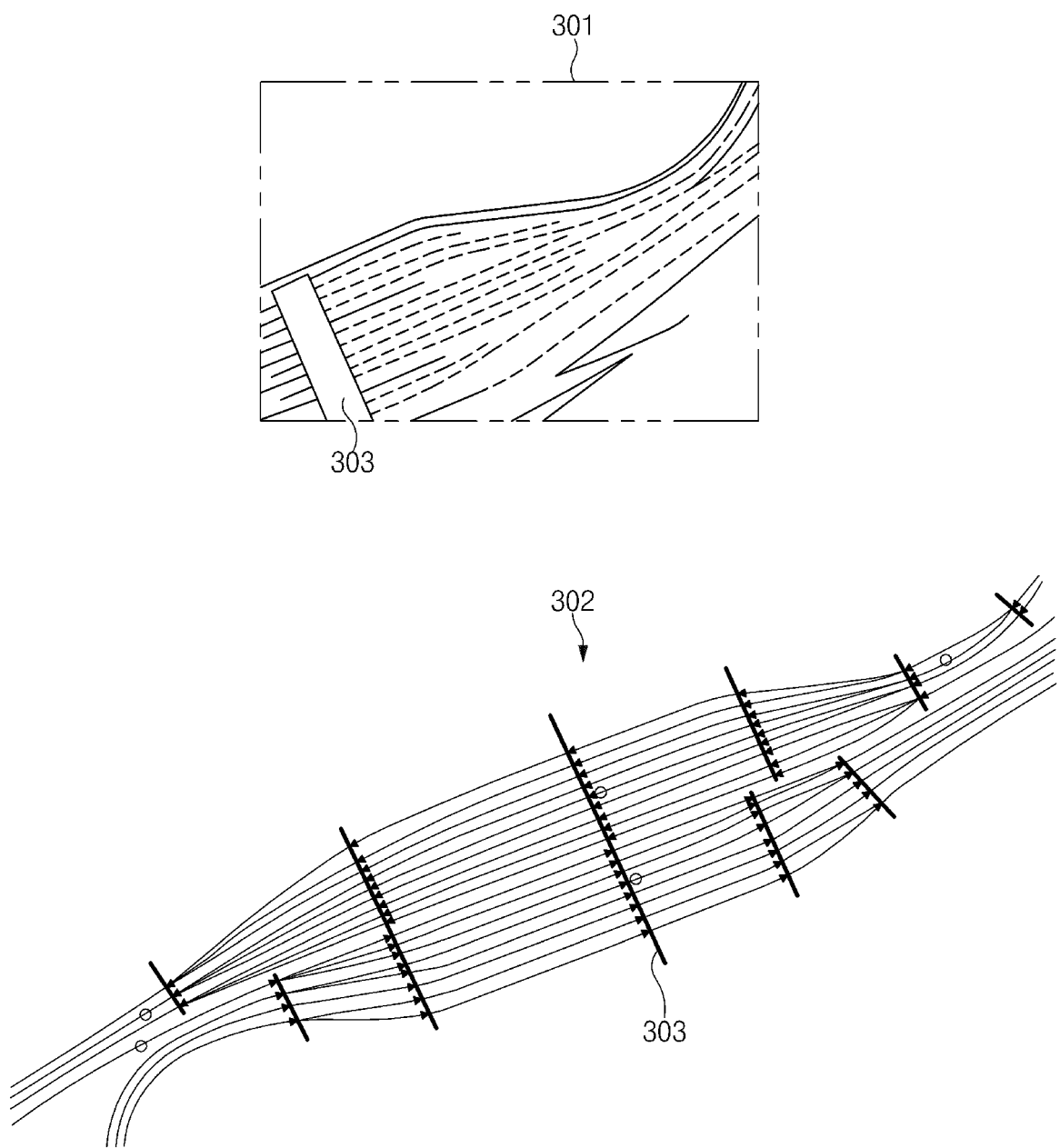
FIG. 3A is a view for describing an increase in the number of lanes due to split of a lane before a tollgate is entered.
Figure 3B:
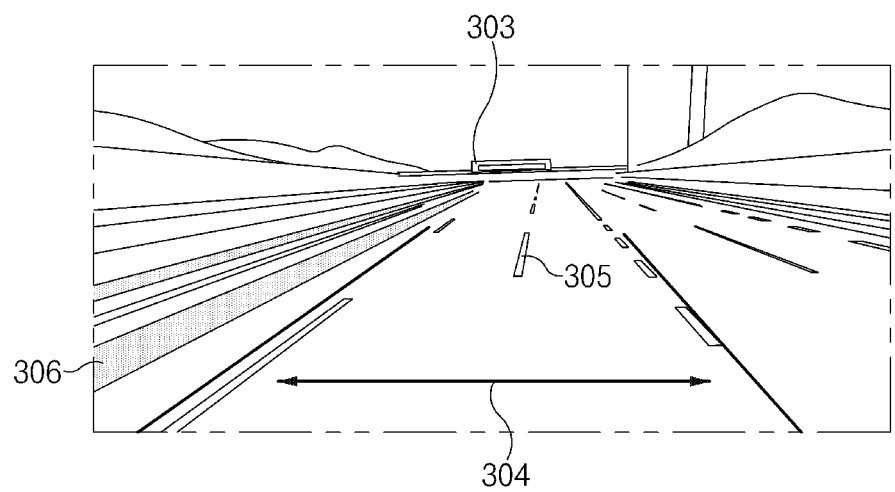
FIG. 3B is a view for describing an operation of determining a driving lane by using a lane width and a split center line.
Figure 3C:
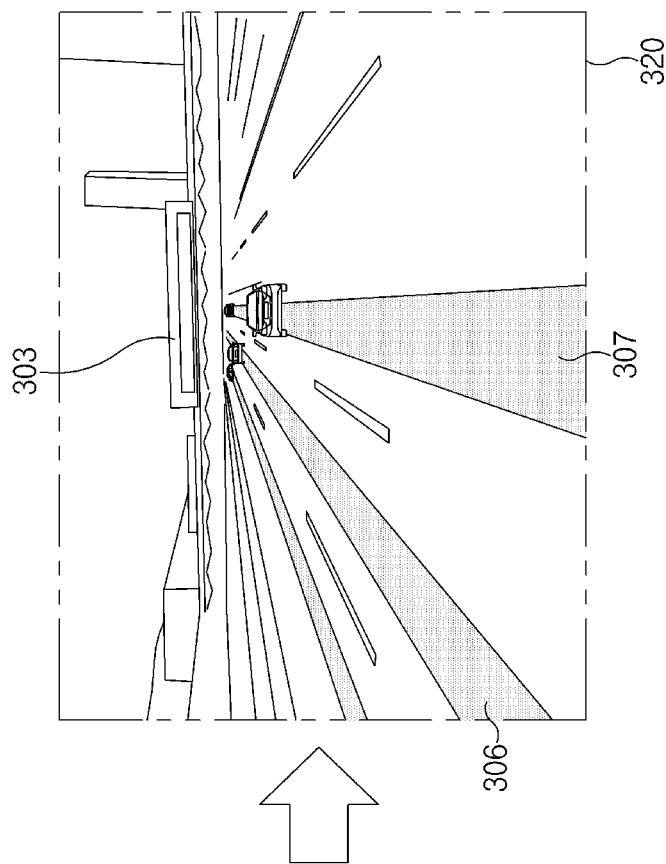
FIG. 3C is a view for describing an example of entering a high-pass lane due to split of a lane.
Figure 3C:
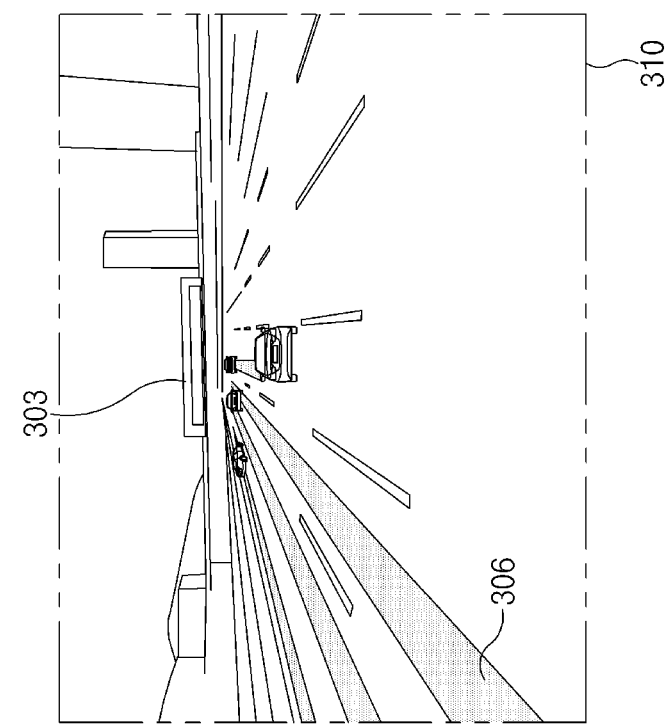

The processor 140 may determine that a lane is split, when at least one or more of an increase in the number of lanes in front of a vehicle, an increase in the lane width in the current driving lane of the vehicle, and the generation of the split center line in the lane on which the vehicle is currently driving. FIG. 3A is a view for describing an increase in the number of lanes due to split of a lane before entry into a tollgate, according to an exemplary form of the present disclosure. FIG. 3B is a view for describing an operation of determining a driving lane by using a lane width and a split center line, according to another form of the present disclosure. FIG. 3C is a view for describing an example of entering a high-pass lane due to split of a lane, according to other form of the present disclosure.

As illustrated in '301' and '302' of FIG. 3A, it is understood by the vehicle controlling apparatus 100 that the number of lanes increases by splitting the road as the vehicle is closer to a tollgate; the vehicle controlling apparatus 100 may list lane information based on map information. As illustrated in FIG. 3B, for the purpose of splitting a road in a general lane instead, not a high-pass lane 306, a lane width 304 of a current driving lane at a point at which the road is split increases and a lane split center line 305 appears at the center of the current driving lane. As such, '320' of FIG. 3C illustrates a high-pass road marking 307 and illustrates the case that the left lane of the split driving lane becomes a high-pass lane and the right lane of the split driving lane remains as a general lane, when the road is split while a vehicle is continuously driving on the current driving lane toward a tollgate 303 as illustrated in '310' of FIG. 3C.

The processor 140 may determine that the driving mode is a driver mode, when the current driving lane of the vehicle is a general lane; the processor 140 may determine that the driving mode is an assist mode or a pilot mode, depending on a state where it is possible to pass through a tollgate, when the current driving lane of the vehicle is a high-pass lane.

Figure 4:
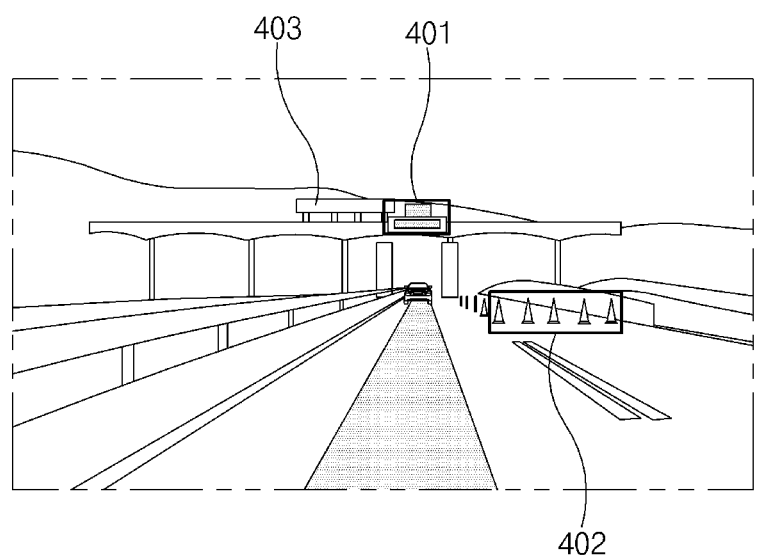
FIG. 4 is a view for describing an exemplary operation of determining whether a tollgate is closed or opened and a state where it is possible to pass through a tollgate.

The processor 140 may determine whether the tollgate is opened or closed, when the current driving lane of the vehicle is a high-pass lane. At this time, the processor 140 may determine whether a tollgate is opened or closed, by using at least one or more of information about whether a tollgate is opened or closed, the state of an indicator light indicating that it is possible to enter a high-pass gate, whether a stop obstacle is present at the entrance of the high-pass gate, and whether the preceding vehicle passes through the gate, which are received from the outside of a vehicle. FIG. 4 is a view for describing an exemplary operation of determining whether a tollgate is closed or opened and a state where it is possible to pass through a tollgate, according to an exemplary form of the present disclosure. Referring to FIG. 4, the vehicle controlling apparatus 100 may recognize a stop obstacle 402 at the entrance of a high-pass gate 401 of a tollgate 403 to determine whether a tollgate is opened or closed and whether it is possible to pass through the tollgate.

The processor 140 may determine that the tollgate is opened, when at least one or more of information about whether a tollgate is opened or closed, the state of an indicator light indicating that it is possible to enter a high-pass gate, whether a stop obstacle is present at the entrance of the high-pass gate, and whether the preceding vehicle passes through a gate, which is received from the outside of a vehicle are determined as the tollgate is opened.

The processor 140 may determine and control the driving mode as the assist mode, when it is determined that the tollgate is closed; the processor 140 may determine whether it is possible to pass through the tollgate, when it is determined that the tollgate is opened. On the other hand, the processor 140 may determine that it is impossible to pass through the tollgate, when it is determined that the tollgate is closed.

The processor 140 may determine that it is possible to pass through the tollgate, when at least two or more of information about whether a tollgate is opened or closed, the state of an indicator light indicating that it is possible to enter a high-pass gate, whether a stop obstacle is present at the entrance of the high-pass gate, and whether the preceding vehicle passes through a gate, which are received from the outside of a vehicle are determined as the tollgate is opened. At this time, a condition of determining that two or more tollgates are opened may not be limited thereto and may be changed as needed.

In addition, the processor 140 may determine that it is impossible to pass through the tollgate, when at least three or more of information about whether a tollgate is opened or closed, the state of an indicator light indicating that it is possible to enter a high-pass gate, whether a stop obstacle is present at the entrance of the high-pass gate, and whether the preceding vehicle passes through a gate, which are received from the outside of a vehicle, indicate that the tollgate is closed. At this time, the above-described three or more conditions that the tollgate is closed may be, but not limited to, one form as criteria for determining whether it is possible to pass through a tollgate and may be set as various combinations.

For example, it is possible to pass through a tollgate, when it is verified a sign indicating that it is possible to enter a high-pass gate and the pass of the preceding vehicle through the corresponding gate.

On the other hand, for example, it is determined the tollgate is opened, based on information received from the outside of a vehicle. However, it is determined that it is impossible to pass through a tollgate, when an indicator light indicating that it is possible to enter a high-pass gate is turned off or 'X' light is displayed and when a stop obstacle is recognized and a preceding vehicle does not pass through the tollgate.

The processor 140 may determine and control the driving mode as the pilot mode, when it is possible to pass through the tollgate.

After controlling a vehicle in the driver mode when the vehicle passes through the tollgate, the processor 140 may automatically switch the driving mode so as to control the vehicle in the assist mode or the pilot mode again.

The sensing module 200 may obtain data associated with an image in front of a lane on which a vehicle is driving and may recognize a high-pass gate in front of the vehicle, a high-pass sign in front of the vehicle, the road marking printed on a road, a lane, a lane width, or the like to obtain information. Furthermore, the sensing module 200 may be configured to obtain information about external objects (e.g., nearby vehicles, pedestrians, cyclists, motor cycles, bicycles, median strips, the number of lanes of driving roads) that are driving in the same lane and neighboring lane to sense the surrounding situation. The information about the external objects may include the location, speed, type, direction of movement, or the like of each of the external objects and may be used later in the pilot mode and the assist mode.

To this end, the sensing module 200 may include at least one or more of a camera, radar, a LiDAR, an ultrasonic sensor, an acceleration sensor, a yaw rate sensor, a torque measurement sensor and/or a wheel speed sensor. Moreover, at least one or more sensors may be mounted on the front, rear, left and right sides of the vehicle.

The GPS receiver 300 receives a GPS signal from a GPS satellite and transmits the GPS signal to the vehicle controlling apparatus 100. As such, the vehicle controlling apparatus 100 may determine the location of the vehicle by using the GPS signal.

The navigation device 400 provides the vehicle controlling apparatus 100 with map information according to the location and destination of the vehicle.

The V2X communication module 500 may perform V2X communication with a vehicle outside the vehicle, road infrastructure, a vehicle center, or the like. In the present disclosure, the V2X communication module 500 may receive information about a lane on which the vehicle is driving, information for determining whether a tollgate through which the vehicle will pass is opened or closed, information for determining whether it is possible to pass through a tollgate. However, FIG. 1 illustrates, but not limited to, the example of the V2X communication module. In addition, information may be received in various manners capable of communicating with the outside of the vehicle.

The steering device 600 may be configured to control the steering angle of the vehicle and may include a steering wheel, an actuator operating in conjunction with the steering wheel, and a controller for controlling the actuator.

The acceleration/deceleration device 700 may be configured to control the speed of the vehicle and may include a throttle, a brake, an actuator operating in conjunction with the throttle and the brake, and a controller that controls the actuator.

As such, the present disclosure may determine whether to enter the tollgate of a highway road and a dedicated road in a route to a destination, may determine a driving mode by determining a condition of a driving lane when a vehicle enters the tollgate or when a vehicle is scheduled to enter the toll gate, may automatically switch the driving mode at the tollgate by automatically switching to a pilot mode or an assist mode in a high-pass lane and by automatically switching to a driver mode in a general lane, thereby expansively applying the driving convenience system function in the tollgate section by performing vehicle control by using the seamless autonomous driving or driving assist function of a vehicle when passing through a tollgate section and enhancing the convenience of the user and the usability of the vehicle system.

Figure 5:
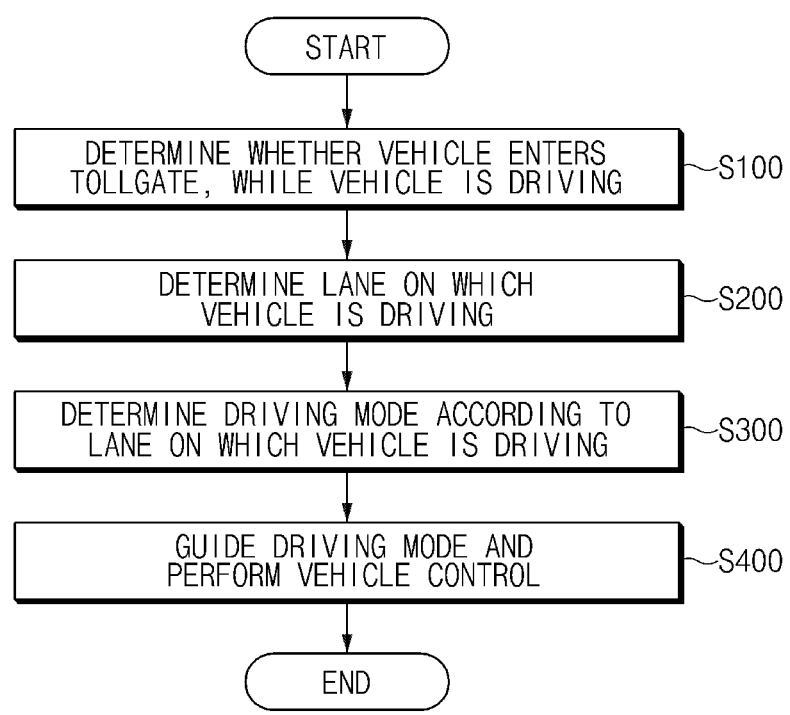
FIG. 5 is a flowchart for describing a method for controlling a vehicle.

Hereinafter, in one form of the present disclosure, a method for controlling a vehicle will be described with reference to FIG. 5. FIG. 5 is a flowchart for describing the method for controlling a vehicle.

Hereinafter, it is assumed that the vehicle controlling apparatus 100 of FIG. 1 performs the process of FIG. 5. In addition, in a description of FIG. 5, it may be understood that an operation described as being performed by a device is controlled by the processor 140 of the vehicle controlling apparatus 100.

Referring to FIG. 5, in operation S100, the vehicle controlling apparatus 100 may determine whether the vehicle currently enters a tollgate, based on image data received from the sensing module 200, information sensed by a LiDAR or radar, GPS information received from the GPS receiver 300, map information received from the navigation device 400, communication information received from the V2X communication module 500, or the like, while a vehicle is driving.

In operation S200, the vehicle controlling apparatus 100 may determine whether a road on which the vehicle is currently driving is a high-pass lane or a general lane, when the vehicle enters the tollgate. That is, the vehicle controlling apparatus 100 may determine whether a road on which the vehicle is currently driving is a high-pass lane or a general lane, based on image data received from the sensing module 200, information sensed by a LiDAR or radar, GPS information received from the GPS receiver 300, map information received from the navigation device 400, communication information received from the V2X communication module 500, or the like, while the vehicle is driving.

The vehicle controlling apparatus 100 may determine whether a road on which a vehicle is currently driving is a high-pass lane or a general lane, by recognizing a high-pass gate, a high-pass road marking, and a high-pass guidance line as illustrated in FIGS. 2A to 2C; alternatively, the vehicle controlling apparatus 100 may determine whether a road on which a vehicle is currently driving is a high-pass lane or a general lane, depending on whether a lane width of the current driving lane increases, whether the split center line in a lane is generated, whether a lane connected to the split road is connected to the high-pass lane, or the like as illustrated in FIGS. 3A to 3C. The operation of determining a lane will be described later with reference to FIG. 6 in detail.

As such, in operation S300, the vehicle controlling apparatus 100 may determine the driving mode depending on the result of determining the lane when it is determined that the road on which a vehicle is currently driving is a high-pass lane or a general lane and, in operation S400, may perform vehicle control depending on the result of determining the lane after guiding the driving mode.

At this time, the vehicle controlling apparatus 100 may determine that the driving mode is a driver mode, when the current driving road is a general lane; the vehicle controlling apparatus 100 may determine that the driving mode is the assist mode or the pilot mode, depending on whether a tollgate is opened or closed and whether it is possible to pass through a tollgate, when the current driving road is a high-pass lane. The operation of determining a driving mode will be described later with reference to FIG. 7 in detail.

Figure 6:
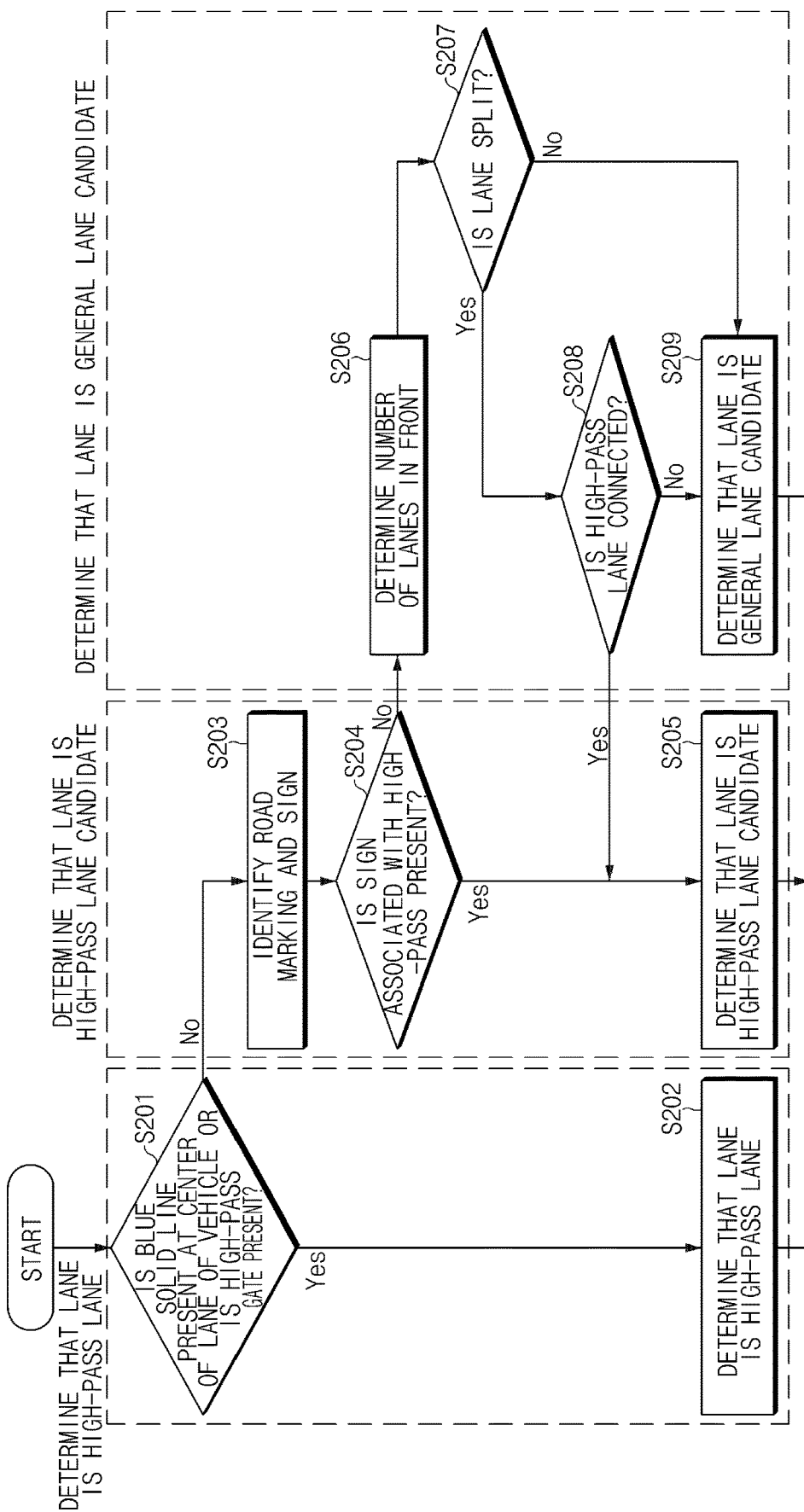
FIG. 6 is a flowchart for describing a method of determining a lane on which a vehicle is driving.

Hereinafter, in one form of the present disclosure, a method of determining a lane on which a vehicle is currently driving will be described with reference to FIG. 6. FIG. 6 is a flowchart for describing the method of determining a lane on which a vehicle is currently driving. FIG. 6 is a flowchart illustrating operation S200 of FIG. 5.

Hereinafter, it is assumed that the vehicle controlling apparatus 100 of FIG. 1 performs a process of FIG. 6. In addition, in a description of FIG. 6, it may be understood that an operation described as being performed by a device is controlled by the processor 140 of the vehicle controlling apparatus 100.

Referring to FIG. 6, in operation S201, the vehicle controlling apparatus 100 may determine whether a blue solid line indicating to be a high-pass lane is present at the center of a lane on which a vehicle is currently driving or whether a high-pass gate is present, through data of an image in front of the vehicle and/or the sensing result of the radar or LiDAR.

In operation S202, the vehicle controlling apparatus 100 may determine that the lane on which the vehicle is currently driving is the high-pass lane, when the blue solid line indicating to be a high-pass lane is present at the center of the lane on which the vehicle is currently driving or when a high-pass gate is present.

In the meantime, in operation S203, the vehicle controlling apparatus 100 may identify the road marking and a sign at a periphery of the road on the lane on which the vehicle is currently driving, through the data of an image in front of the vehicle and/or the sensing result of the radar or LiDAR, when the blue solid line indicating to be a high-pass lane is not present at the center of the lane on which the vehicle is currently driving or a high-pass gate is not present in operation S201.

As such, in operation S204, the vehicle controlling apparatus 100 may determine whether high-pass road marking is present on a road on which the vehicle is currently driving or whether a sign indicating to be a high-pass lane is present, from the identified information; in operation S205, the vehicle controlling apparatus 100 may determine that the lane is a high-pass lane candidate, when high-pass road marking is present on the road on which the vehicle is currently driving or when the sign indicating to be a high-pass lane is present. The vehicle controlling apparatus 100 may determine the driving mode by determining that the high-pass lane candidate is a high-pass lane when determining the driving mode in the future, when the lane is a high-pass lane candidate.

In the meantime, in operation S206, the vehicle controlling apparatus 100 may determine the number of lanes in front of the vehicle on the road on which the vehicle is currently driving, through the data of an image in front of the vehicle, the sensing result of the radar or LiDAR, and/or map information, when the high-pass road marking is not present on the road on which the vehicle is currently driving or when the sign indicating to be a high-pass lane is not present.

Afterward, in operation S207, the vehicle controlling apparatus 100 may determine whether the number of lanes increases due to the split of the lane as compared with the number of lanes in front of the vehicle, whether a lane width increases, or whether a split center line is generated, through the data of an image in front of the vehicle, the sensing result of the radar or LiDAR, and/or map information.

At this time, in operation S209, the vehicle controlling apparatus 100 may determine that the lane on which the vehicle is currently driving is a general lane candidate, when the number of lanes does not increase or when the lane width does not increase and the split center line is not generated, that is, when the lane is not split. The vehicle controlling apparatus 100 may determine the driving mode by determining that the general lane candidate is a general lane when determining the driving mode in the future, when the lane is a general lane candidate.

Meanwhile, in operation S208, the vehicle controlling apparatus 100 may determine whether a high-pass lane is connected, based on the map information, when it is determined that the lane is split, by increasing the number of lanes, by increasing a lane width, or by generating a split center line. That is, as illustrated in FIG. 3B, it may be determined that the road is split, when the lane width increases or when a split center line is generated at the center of the lane; as illustrated in FIG. 3C, it may be determined whether the road on which the vehicle is currently driving is connected to the high-pass lane after the road is split.

In operation S205, the vehicle controlling apparatus 100 may determine that the lane on which the vehicle is currently driving is a high-pass lane candidate, when the road is connected to the high-pass lane after the current driving lane is split; the vehicle controlling apparatus 100 may determine that the lane on which the vehicle is currently driving is a general lane candidate, when the road is not connected to the high-pass lane after the current driving lane is split.

Figure 7:
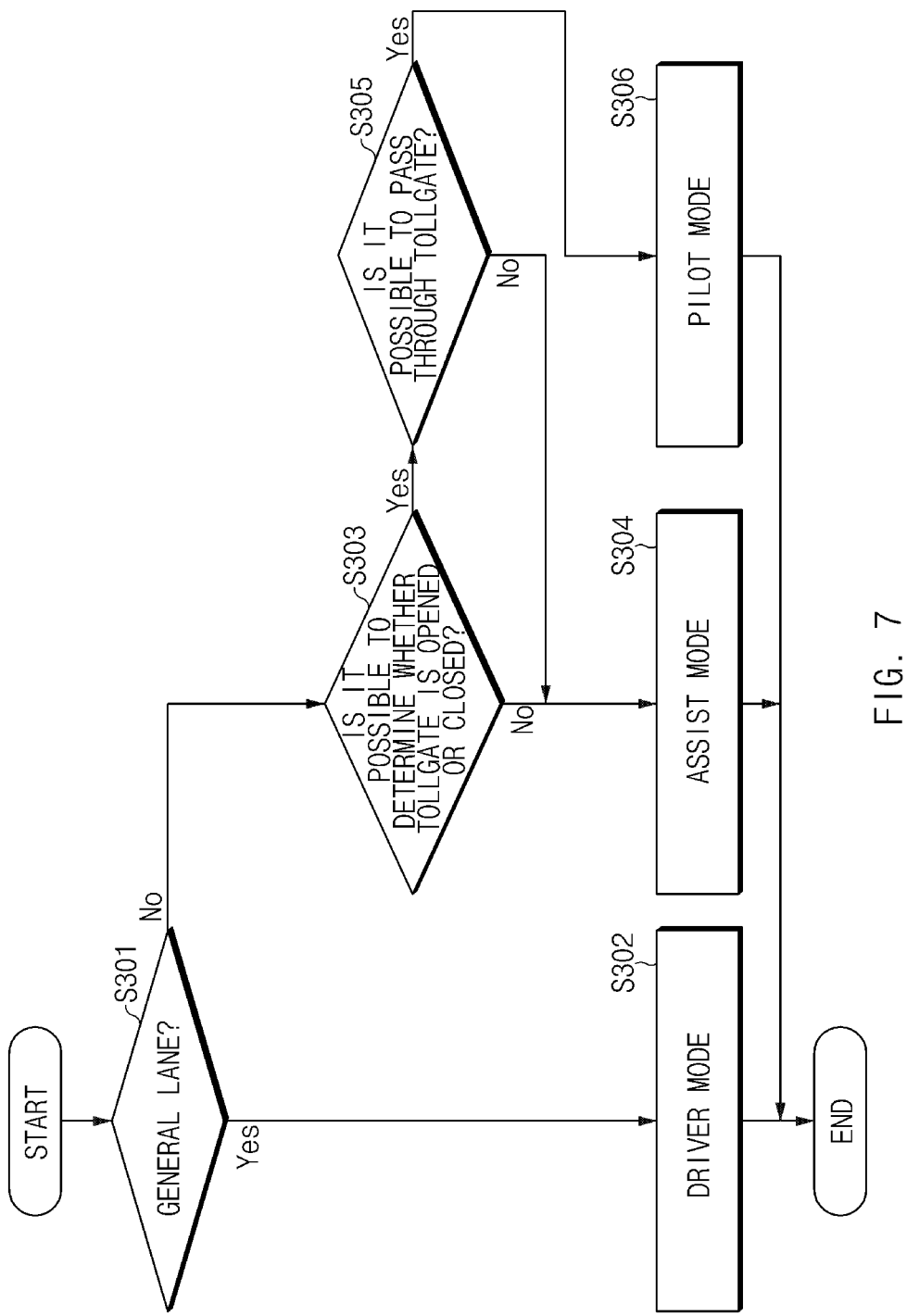
FIG. 7 is a flowchart for describing a method for controlling a vehicle.

Hereinafter, in another form of the present disclosure, a method for controlling a vehicle will be described in detail with reference to FIG. 7. FIG. 7 is a flowchart for describing the method for controlling a vehicle.

Hereinafter, it is assumed that the vehicle controlling apparatus 100 of FIG. 1 performs the process of FIG. 7. In addition, in a description of FIG. 7, it may be understood that an operation described as being performed by a device is controlled by the processor 140 of the vehicle controlling apparatus 100.

Referring to FIG. 7, in operation S301, the vehicle controlling apparatus 100 may determine a lane on which a vehicle is currently driving; the vehicle controlling apparatus 100 may determine that a driving mode is a driver mode, when the lane on which the vehicle is currently driving is a general lane. As such, the vehicle controlling apparatus 100 may transfer the control right of the driving of the vehicle to the user (driver) so as to be suitable for the driver mode.

In operation S303, the vehicle controlling apparatus 100 may determine whether a tollgate connected to the lane is opened or closed, when the lane on which the vehicle is currently driving is not the general lane, that is, when the lane on which the vehicle is currently driving is a high-pass lane.

At this time, the vehicle controlling apparatus 100 may determine whether a tollgate is opened or closed, by using information about whether a tollgate is opened or closed, whether an indicator light indicating that it is possible to enter a high-pass gate is turned on or off, whether a stop obstacle is present at the entrance of the high-pass gate, whether a preceding vehicle passes through the gate, or the like, which is received from the outside of a vehicle over V2X communication or separate communication. That is, the vehicle controlling apparatus 100 may determine that the tollgate of the corresponding lane is opened, when at least one or more of conditions of determining whether the tollgate is opened or closed determined as the tollgate is opened, for example, the case of receiving information indicating that a tollgate is opened or closed, from the outside of the vehicle over V2X communication or separate communication, the case that an indicator light indicating that it is possible to enter a high-pass gate is turned on ('O' state among 'O' state or 'X' state) or that there is no stop obstacle at the entrance of the high-pass gate, the case that it is determined that the preceding vehicle according to movement trace passes through the gate, or the like.

In operation S304, the vehicle controlling apparatus 100 determines that the driving mode is an assist mode and controls the vehicle in the assist mode in which the vehicle system assists the driving support but the subject of the determination responsibility is a user, when it is determined that the tollgate is closed.

In the meantime, in operation S305, the vehicle controlling apparatus 100 determines whether the vehicle passes through the tollgate, that is, a passable state, when it is determined that the tollgate is opened.

The vehicle controlling apparatus 100 determines that it is possible to pass through the tollgate, when at least two or more conditions indicate that the tollgate is opened among the conditions of determining whether the tollgate is opened or closed in operation S303. On the other hand, the vehicle controlling apparatus 100 determines that it is impossible to pass through the tollgate, when at least four or more conditions indicate that the tollgate is closed among the conditions of determining whether the tollgate is opened or closed in operation S303.

In operation S304, the vehicle controlling apparatus 100 may determine that the driving mode is the assist mode, when it is not possible to pass through the tollgate; in operation S306, the vehicle controlling apparatus 100 may determine that the driving mode is the pilot mode in which a vehicle system controls and determines the driving of the vehicle, when it is determined that it is possible to pass through the tollgate.

As such, the present disclosure may determine the condition of a driving lane in the tollgate section of a highway road and a vehicle-dedicated road to determine a driving mode and may automatically switch the driving mode, thereby expansively applying the driving convenience system function in the tollgate section of the highway road and the vehicle-dedicated road and enhancing the convenience of the user and the usability of the vehicle system.

Figure 8:
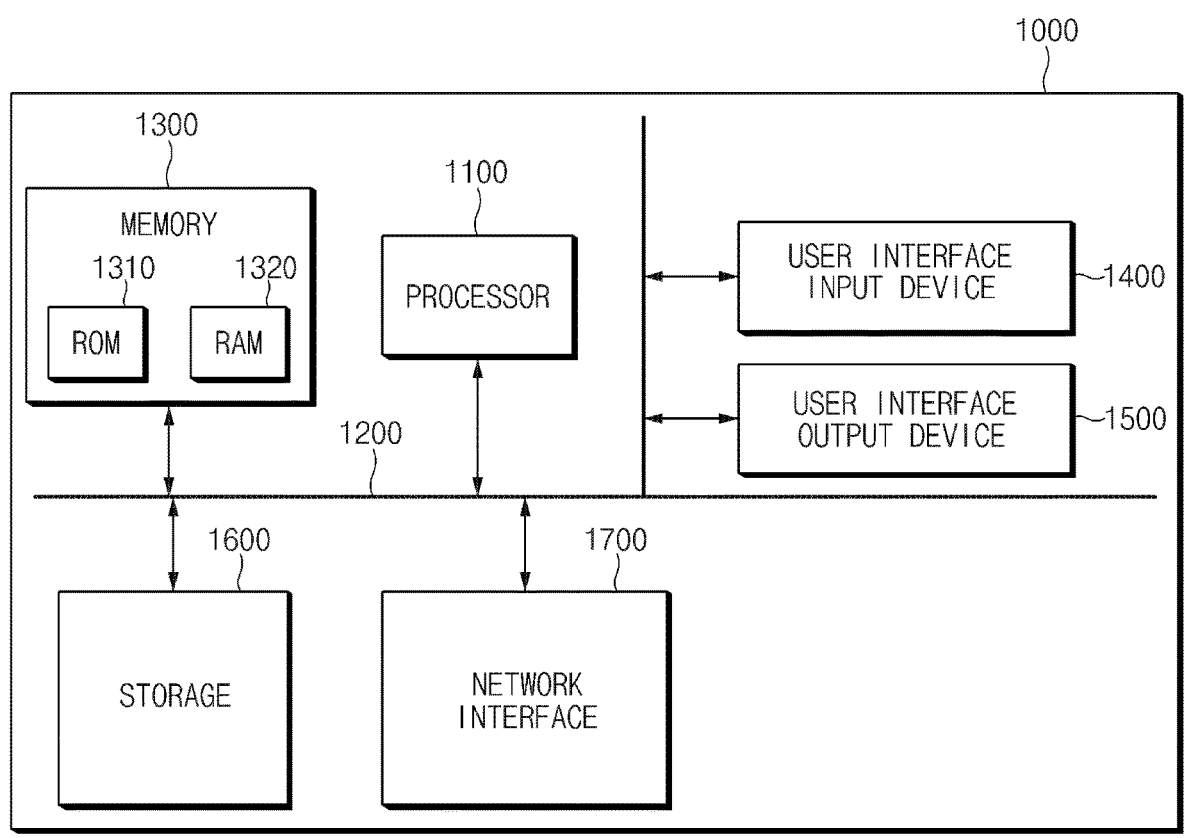
FIG. 8 illustrates a computing system.

FIG. 8 illustrates a computing system according to an exemplary form of the present disclosure.

Referring to FIG. 8, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Thus, the operations of the methods or algorithms described in connection with the forms disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component in the user terminal.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

Therefore, forms of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

The technology may determine a lane on which a vehicle is currently driving, may automatically switch the driving mode depending on whether the lane on which the vehicle is currently driving is a high-pass lane to control the vehicle, thereby improving the stability and usability of a vehicle system.

Besides, a variety of effects directly or indirectly understood through the present disclosure may be provided.

What is claimed is:

1. An apparatus for controlling a vehicle, the apparatus comprising:
  a processor configured to:
    determine whether the vehicle enters a tollgate, in advance, based on driving situation information,
    determine, when the vehicle is scheduled to enter the tollgate, whether a current driving lane of the vehicle is a high-pass lane or a general lane, and
    automatically switch a driving mode based on the current driving lane of the vehicle and control the vehicle; and
  a storage configured to store information determined by the processor,
  wherein the processor is further configured to:
    when the current driving lane of the vehicle is the high-pass lane, determine the driving mode and control the vehicle in an assist mode or a pilot mode based on determining whether the tollgate is opened or closed,
    determine whether the tollgate is opened or closed, when the current driving lane of the vehicle is the high-pass lane, when the tollgate is closed, determine and control the driving mode as the assist mode in which the vehicle system assists driving of the vehicle while allowing a user of the vehicle to override a determined driving mode and manually drive the vehicle, and when passing through the tollgate is possible, determine and control the driving mode as the pilot mode.

2. The apparatus of claim 1, wherein the driving situation information includes at least one of image information in front of the vehicle, sensing information, map information, location information, or information received from an outside of the vehicle.

3. The apparatus of claim 1, wherein the processor is configured to:

determine whether the current driving lane of the vehicle is the high-pass lane or the general lane, based on at least one of a high-pass gate sign in front, a high-pass guidance line, a high-pass guidance sign, a high-pass road marking, or whether the current driving lane is split.

4. The apparatus of claim 3, wherein the processor is configured to:

determine whether the current driving lane is split, based on at least one of an increase in a number of lanes in front, whether a lane width of the current driving lane of the vehicle increases, or whether a split center line in the current driving lane of the vehicle is generated.

5. The apparatus of claim 1, wherein the processor is configured to:

determine that the current driving lane of the vehicle is the high-pass lane, when a high-pass guidance lane is present in the current driving lane of the vehicle or when a high-pass gate is present in front.

6. The apparatus of claim 5, wherein the processor is configured to:

when the high-pass guidance lane is not present in the current driving lane of the vehicle and the high-pass gate is not present in front,
determine whether a high-pass sign is present in front or whether a high-pass road marking is present in a lane, and
determine that the current driving lane is a high-pass lane candidate, when the high-pass sign is present in front or the high-pass road marking is present in the current driving lane.

7. The apparatus of claim 6, wherein the processor is configured to:

when the high-pass sign is not present in front and the high-pass road marking is not present in the current driving lane,
determine whether the current driving lane of the vehicle is split.

8. The apparatus of claim 7, wherein the processor is configured to:

determine that the current driving lane is split, when at least one of an increase in a number of lanes in front of the vehicle, an increase in a lane width of the current driving lane of the vehicle, or generation of a split center line in the current driving lane of the vehicle occur.

9. The apparatus of claim 1, wherein the processor is configured to:

determine and control a driving mode as a driver mode, when the current driving lane of the vehicle is the general lane.

10. The apparatus of claim 1, wherein the processor is configured to:

determine whether the tollgate is opened or closed, based on at least one of information about whether the tollgate is opened or closed, a state of an indicator light indicating a possibility to enter a high-pass gate, whether a stop obstacle is present at an entrance of the high-pass gate, or whether a preceding vehicle passes through the high-pass gate, which are received from an outside of the vehicle.

11. The apparatus of claim 10, wherein the processor is configured to:

determine that the tollgate is opened, when information of a status of the tollgate indicates that the tollgate is open, when the state of the indicator light indicates that entering the high-pass gate is possible, when the stop obstacle is not present at the entrance of the high-pass gate, or when the preceding vehicle passes through the high-pass gate.

12. The apparatus of claim 10, wherein the processor is configured to:

determine whether passing through the tollgate is possible after determining that the tollgate is open.

13. The apparatus of claim 12, wherein the processor is configured to:

determine that the passing through the tollgate is possible when at least two following information indicate that the tollgate is open:
the information about whether the tollgate is opened or closed,
the state of the indicator light indicating the possibility to enter the high-pass gate,
whether the stop obstacle is present at the entrance of the high-pass gate, and
whether the preceding vehicle passes through the high-pass gate.

14. A vehicle system, comprising:

a sensing module configured to obtain driving situation information in front of a vehicle and in a lane; and
a vehicle controlling apparatus, wherein the vehicle controlling apparatus is configured to:
determine whether the vehicle enters a tollgate, in advance, based on the driving situation information;
determine, when the vehicle is scheduled to enter the tollgate, whether a current driving lane of the vehicle is a high-pass lane or a general lane;
automatically switch a driving mode based on whether the current driving lane of the vehicle is the high-pass lane or the general lane and control the vehicle;
when the current driving lane of the vehicle is the high-pass lane, determine the driving mode and control the vehicle in an assist mode or a pilot mode based on determining whether the tollgate is opened or closed;
when the tollgate is closed, determine and control the driving mode as the assist mode in which the vehicle system assists driving of the vehicle while allowing a user of the vehicle to override a determined driving mode and manually drive the vehicle; and
when passing through the tollgate is possible, determine and control the driving mode as the pilot mode.

15. A method for controlling a vehicle, the method comprising:

determining, by a processor, whether the vehicle enters a tollgate;
determining, by the processor, when the vehicle is scheduled to enter the tollgate, whether a current driving lane of the vehicle is a high-pass lane or a general lane, based on driving situation information;

automatically switching, by the processor, a driving mode based on whether the current driving lane of the vehicle is the high-pass lane or the general lane and control the vehicle;

in response to determining that the current driving lane of the vehicle is the high-pass lane, determining, by the processor, the driving mode and controlling the vehicle in an assist mode or a pilot mode based on determining whether the tollgate is opened or closed;

determining that the driving mode is a driver mode, when the current driving lane of the vehicle is the general lane;

in response to determining that the current driving lane of the vehicle is the high-pass lane and the tollgate is opened, controlling the vehicle in the pilot mode; and in response to determining that the current driving lane of the vehicle is the high-pass lane and the tollgate is closed, controlling the vehicle in the assist mode in which a vehicle system assists driving of the vehicle by a user while allowing the user of the vehicle to override a determined driving mode and manually drive the vehicle.

* * * * *